US008509859B2

(12) United States Patent
Jarosinski et al.

(10) Patent No.: US 8,509,859 B2
(45) Date of Patent: Aug. 13, 2013

(54) APPARATUS AND METHODS FOR CONTROL OF SLEEP MODES IN A TRANSCEIVER

(75) Inventors: Tadeusz Jarosinski, San Diego, CA (US); Chinnappa K. Ganapathy, San Diego, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 11/372,876

(22) Filed: Mar. 10, 2006

(65) Prior Publication Data

US 2006/0240798 A1    Oct. 26, 2006

Related U.S. Application Data

(60) Provisional application No. 60/660,916, filed on Mar. 11, 2005.

(51) Int. Cl.
  *H04B 1/16* (2006.01)
  *H04B 1/38* (2006.01)
  *H04M 1/00* (2006.01)

(52) U.S. Cl.
  USPC .............. 455/574; 455/127.5; 455/343.2; 455/343.5; 455/343.1

(58) Field of Classification Search
  USPC .......... 340/3.1, 3.4; 370/311–31; 455/574, 455/343.1, 343.2, 572, 127.5, 343.4, 343.5, 455/127.1, 343.6
  See application file for complete search history.

(56) References Cited

U.S. PATENT DOCUMENTS

| 5,428,820 | A  |   | 6/1995  | Okada et al.          |
|-----------|----|---|---------|-----------------------|
| 5,708,658 | A  |   | 1/1998  | Sugita                |
| 5,950,120 | A  |   | 9/1999  | Gardner et al.        |
| 6,073,035 | A  |   | 6/2000  | Witter                |
| 6,088,602 | A  | * | 7/2000  | Banister ........ 455/574 |
| 6,282,415 | B1 | * | 8/2001  | Buhler et al. ....... 455/343.1 |
| 6,311,081 | B1 | * | 10/2001 | Northcutt et al. ..... 455/574 |
| 6,341,224 | B1 |   | 1/2002  | Dohi et al.           |
| 6,353,749 | B1 | * | 3/2002  | Siponen ......... 455/574 |
| 6,356,538 | B1 | * | 3/2002  | Li ............... 370/311 |

(Continued)

FOREIGN PATENT DOCUMENTS

| EP | 0 865 167 A2 | 9/1998 |
| JP | 2000023263   | 1/2000 |

(Continued)

OTHER PUBLICATIONS

International Search Report, PCT/US2006/009478, International Searching Authority, European Patent Office, Jul. 4, 2006.

(Continued)

*Primary Examiner* — Pablo Tran
(74) *Attorney, Agent, or Firm* — Fulbright & Jaworski LLP

(57) ABSTRACT

Disclosed are apparatus and methods for control of sleep modes in a transceiver or receiver. In particular, a transceiver is disclosed including a processor configured to determine timing information concerning sleep periods for at least a portion of components within the transceiver. The transceiver also includes a sleep control logic coupled to the processor to receive information concerning sleep periods from the processor and configured to effect shutting down of the at least a portion of the components of the transceiver during power reduction periods independent of the processor.

22 Claims, 7 Drawing Sheets

(56) References Cited

U.S. PATENT DOCUMENTS

| | | | |
|---|---|---|---|
| 6,400,961 B1 * | 6/2002 | Lillie et al. | 455/552.1 |
| 6,418,127 B1 * | 7/2002 | Laurent | 370/311 |
| 6,522,873 B1 * | 2/2003 | Moles et al. | 455/343.1 |
| 6,584,330 B1 * | 6/2003 | Ruuska | 455/574 |
| 6,691,071 B2 * | 2/2004 | Kerr et al. | 702/188 |
| 6,728,234 B1 * | 4/2004 | Hofmann et al. | 370/350 |
| 6,760,579 B1 | 7/2004 | Yokoyama et al. | |
| 6,799,030 B2 * | 9/2004 | Barber et al. | 455/343.1 |
| 6,876,874 B2 * | 4/2005 | Arnaud et al. | 455/574 |
| 6,947,732 B2 * | 9/2005 | Fraser | 455/420 |
| 6,952,571 B1 * | 10/2005 | Garrabrant et al. | 455/226.2 |
| 7,073,080 B2 * | 7/2006 | Lou | 713/320 |
| 7,133,702 B2 * | 11/2006 | Amerga et al. | 455/574 |
| 7,200,379 B2 * | 4/2007 | Edwards et al. | 455/343.1 |
| 7,289,832 B1 * | 10/2007 | Enoki et al. | 455/574 |
| 7,421,291 B2 * | 9/2008 | Karaoguz et al. | 455/574 |
| 7,463,910 B2 * | 12/2008 | Wang et al. | 455/574 |
| 7,512,423 B2 * | 3/2009 | Karaoguz | 455/574 |
| 7,733,835 B2 * | 6/2010 | Sammour et al. | 370/338 |

FOREIGN PATENT DOCUMENTS

| | | |
|---|---|---|
| JP | 2000165963 A | 6/2000 |
| JP | 2002-009688 | 1/2002 |
| JP | 2002009688 | 1/2002 |
| JP | 2002314678 A | 10/2002 |
| KR | 2002-0057209 | 7/2002 |
| TW | 200414707 | 8/2004 |
| TW | 200726129 | 7/2007 |
| WO | WO2004042941 | 5/2004 |

OTHER PUBLICATIONS

Written Opinion, PCT/US2006/009478, International Searching Authority, European Patent Office, Jul. 4, 2006.

International Preliminary Report on Patentability, PCT/US2006/009478, The International Bureau of WIPO, Geneva, Switzerland, Sep. 12, 2007.

Taiwan Search Report—TW095108449—TIPO—Dec. 20, 2011.

* cited by examiner

APPARATUS AND METHODS FOR CONTROL OF SLEEP MODES IN A TRANSCEIVER

CLAIM OF PRIORITY UNDER 35 U.S.C. §119

The present Application for Patent claims priority to Provisional Application No. 60/660,916 entitled "RECEIVER SLEEP MODE CONTROLLER" filed Mar. 11, 2005, and assigned to the assignee hereof and hereby expressly incorporated by reference herein.

BACKGROUND

1. Field

The present disclosure relates to apparatus and methods for control of sleep modes in a transceiver and, more particularly, for automated control of different sleep modes using a hardware implemented sleep mode controller.

2. Background

Conservation of energy in battery-powered devices, such as mobile phones, is an important concern in order to maximize the limited energy available to such devices. During operation of mobile devices such as mobile phones, however, it is known that some of the power consuming units within such devices can be temporarily powered down without adversely affecting the performance of the mobile device. This powering down, known as "sleep," affords power savings since current consuming units only consume power periodically, rather than continuously.

In order to improve the battery life of a device, it is known to place numerous current consuming units within the device into a power saving mode and maintain the system time using low-power sleep circuits. Because of the high current draw (and, thus, power usage) of voltage-controlled temperature-compensated oscillators (VCTCXOs) that are used for accurate system timing in a mobile device, in particular, it is not energy efficient to use such devices to maintain system time for sleep circuits. Accordingly, it is known to maintain system timing during sleep or power saving modes by using a sleep controller consuming much less power and clocked by a crystal oscillator at lower frequency (e.g., 30-60 kHz) rather than the VCTCXO frequency, which is usually much higher (e.g., 19.2 MHz). Usage of the cost effective crystal oscillator as the sleep controller clocking device is at the expense of some accuracy in time keeping because the clock frequency tends to drift with temperature. This clock is otherwise known as the "sleep clock" or "slow clock." Thus, when the mobile device is asleep, the system clock or "fast clock" (and VCTCXO) is off. The sleep clock is used as a timer to wake up the system. Upon wake up, once the fast clock becomes stable after waking up, system timing is once again handed over to the fast clock.

Furthermore, in certain types of transceivers that receive burst type communications, such as in orthogonal frequency division multiplexed (OFDM) systems, the nature of such systems lend themselves to sleep mode usage due to the periodic nature of when system resources are actually used. In such devices, however, the use of software execution of timing events for shutting down components or waking up components can engender latencies that cause errors or do not result in effective reduction of power consumption during sleep mode due to under utilization of the potentially available time for shutdown of components.

SUMMARY

According to an aspect of the present disclosure, a wireless transceiver is disclosed including a processor configured to determine timing information concerning sleep periods for at least a portion of components within the transceiver; and a sleep control logic coupled to the processor to receive information concerning sleep periods from the processor and configured to effect shutting down and waking up of the at least a portion of the components of the transceiver during power reduction periods independent of the processor.

According to another aspect of the present disclosure, a sleep controller for use in a wireless transceiver is disclosed and includes a sleep control logic communicatively coupled to a processor to receive information concerning sleep periods from the processor and configured to effect shutting down and powering up of the at least a portion of the components of the transceiver during power reduction periods independent of the processor.

According to yet another aspect of the present disclosure, a method for controlling sleep modes in a wireless transceiver is disclosed and includes determining timing information concerning sleep periods for at least a portion of components within the transceiver with a processor; and receiving information concerning sleep periods from the processor with a sleep control logic coupled to the processor; and shutting down of the at least a portion of the components of the transceiver during power reduction periods independent of and synchronously with the system time.

According to a further aspect of the present disclosure, another transceiver apparatus is disclosed. The transceiver apparatus includes means for determining timing information concerning sleep periods for at least a portion of components within the transceiver; means for outputting information concerning sleep periods from the means for determining; and means for executing sleep periods configured to shut down the at least a portion of the components of the transceiver during power reduction periods independent of and synchronous with the means for determining timing information.

According to still another aspect, a computer-readable medium encoded with a set of instructions is disclosed. The instructions include an instruction for determining timing information concerning sleep periods for at least a portion of components within the transceiver with a processor; an instruction for receiving information concerning sleep periods from the processor with a sleep control logic coupled to the processor; and an instruction for shutting down of the at least a portion of the components of the transceiver during power reduction periods independent of and synchronous with a transceiver system timing.

DETAILED DESCRIPTION

Figure 1:
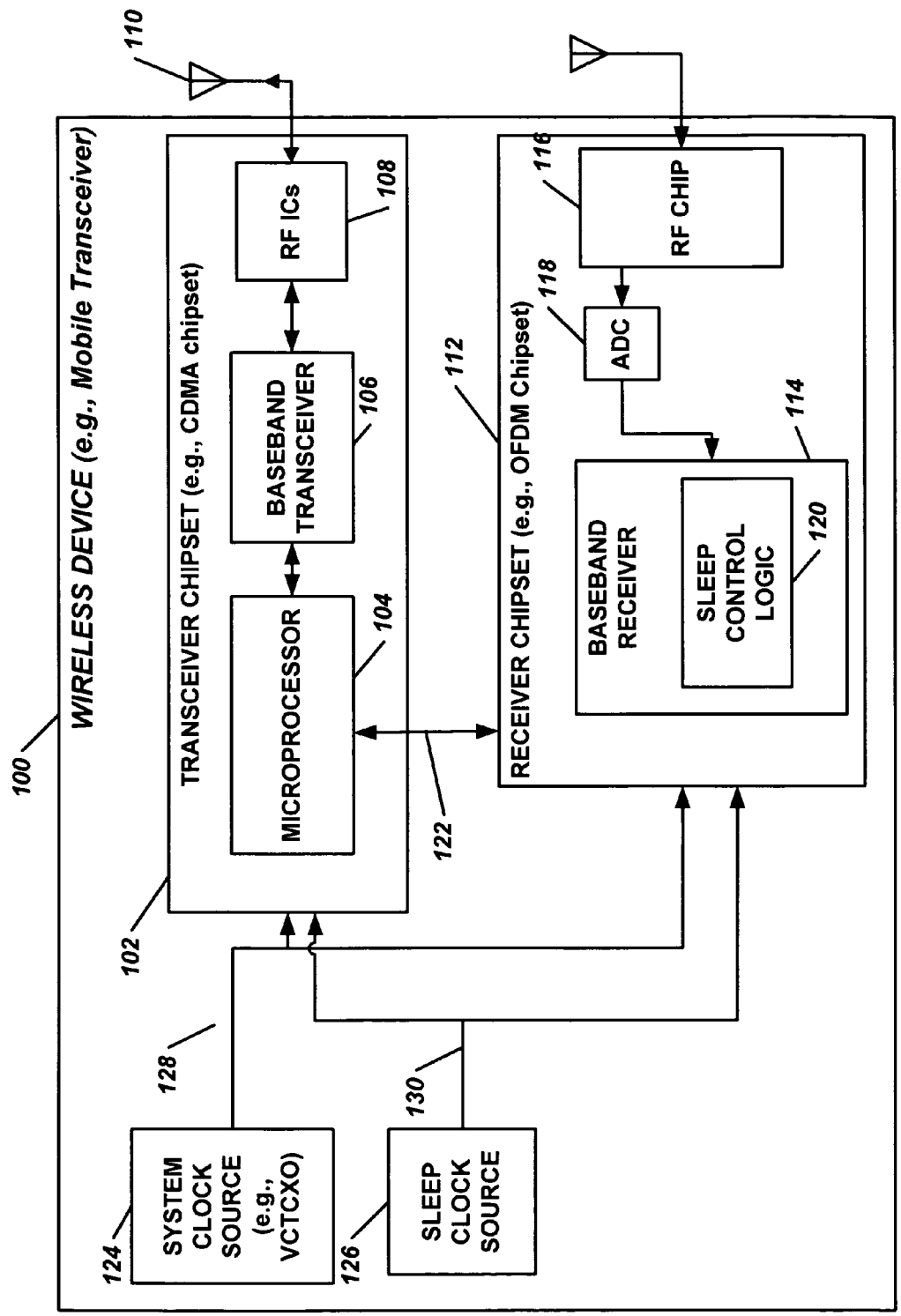
FIG. 1 is an exemplary block diagram of wireless device including an implemented sleep controller.

FIG. 1 illustrates a wireless device 100, such as a mobile transceiver for receiving and transmitting wireless communication signals, such as CDMA and OFDM signals. As illustrated, the transceiver 100 includes a transceiver chipset 102 used for processing communications signals received or to be transmitted. The chipset 102 includes a microprocessor 104, which may be a single processor or multiple processors such as a general purpose processor (GPP) and a digital signal processor (DSP). It also includes the baseband transceiver 106 and the RF integrated circuits 108, which are used to actually receive and transmit the wireless communication signals via antenna(s) 110. As will be described further below, the microprocessor 104 is configured to execute software that determines timing of sleep modes for the transceiver device 100. That is, the software run by the microprocessor 104 determines when particular components of the transceiver device 100 may be powered down to conserve life of the device battery (not shown).

The transceiver 100 also includes another chipset used to receive communication signals, such as burst communications in an orthogonal frequency division multiplexed (OFDM) system, for example. This chipset is shown as a receiver chipset 112 in the example of FIG. 1. Within the chipset 112 is another baseband circuit including a baseband receiver 114, which processes received communication signals. In particular, the baseband receiver 114 receives communication signals from a RF chip 116 and an analog-to-digital converter (ADC) 118 (e.g., a sigma-delta modulator ADC). Additionally, the chipset 112 includes sleep control logic 120 that is used to execute sleep modes within the receiver chipset 112. Logic 120 may be implemented with digital logic or any other suitable hardware that characteristically execute instructions quickly with low latency. The chipset is coupled to the microprocessor 104 via bus 122, such as external parallel or serial bus and GPIO (general purpose input/output), in order to communicate sleep mode timing information to the hardware sleep control logic 120. Logic 120, in turn, then actually executes the sleep mode timing, as will be discussed in more detail below.

Additionally, the transceiver 100 includes a fast and accurate system clock 124, originating from a stable source, such as a voltage controlled temperature compensated crystal oscillator (VCTCXO) used for providing system timing when the transceiver 100 is in awake modes. A sleep clock source 126, which consumes less power and is slower than the fast clock 124, is used for system timing during sleep modes to conserve battery energy. Each of the chipsets 102 and 112 receive clock signals from clocks 124 and 126 as illustrated by connections 128 and 130, respectively.

Figure 2:
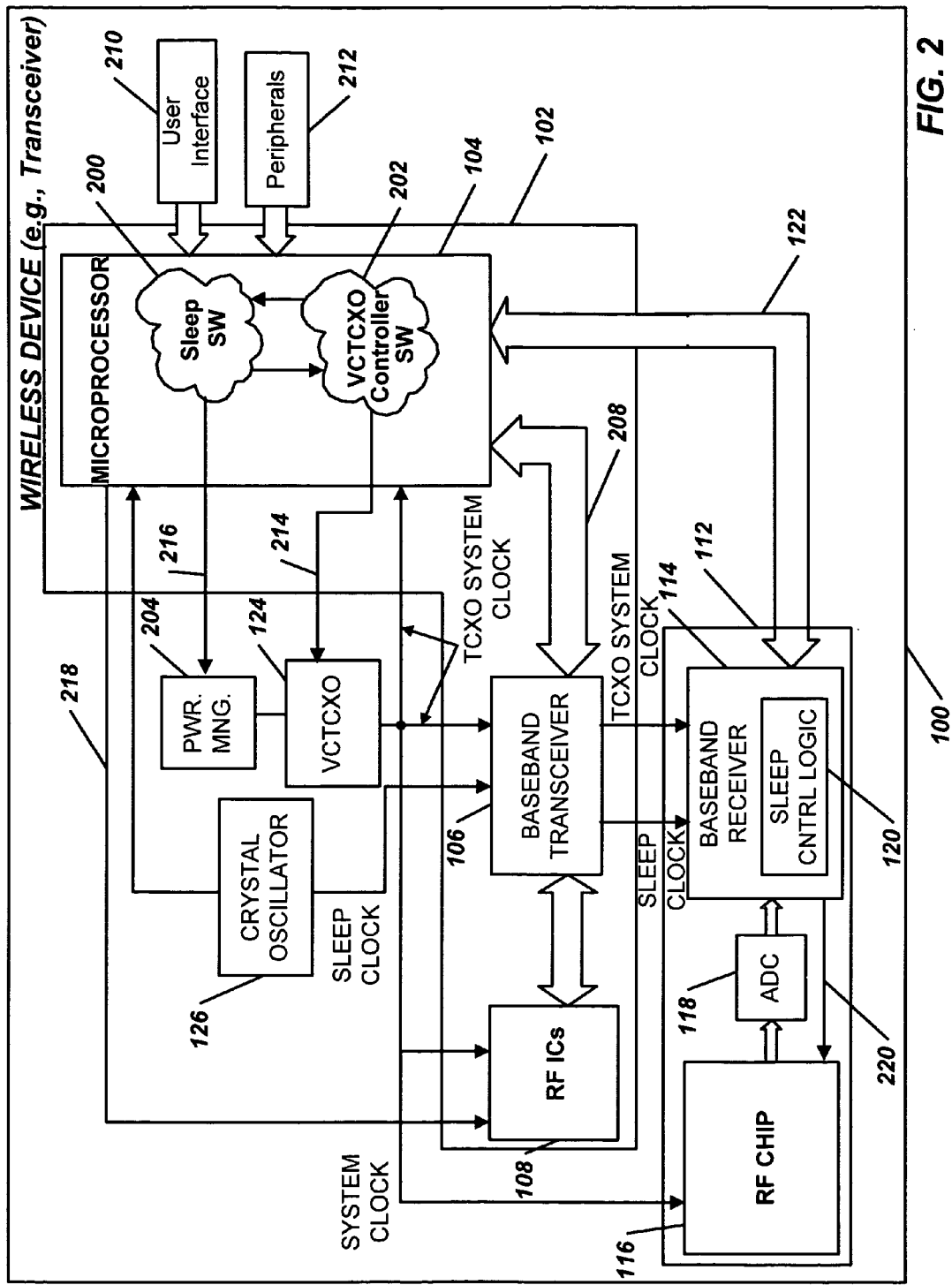
FIG. 2 is an exemplary block diagram illustrating a more detailed architecture of the transceiver of FIG. 1 including a hardware implemented sleep controller.

FIG. 2 illustrates an exemplary detailed block diagram of portions of the transceiver 100 utilizing chipset-based phone architecture. The transceiver 100 includes the transceiver chipset 102, such as a CDMA transceiver chipset, which includes microprocessor 104. The transceiver 100 also includes receiver chipset 112 that is used to receive broadcast wireless signals, including those utilizing burst communication (i.e., bursts of packets of information). Examples of such standards include orthogonal frequency division multiplexing (OFDM) standards. Within the receiver chipset 112, the baseband receiver 114 utilizes sleep control logic 120, which executes sleep modes determined by the microprocessor 104.

In the particular architecture exemplified in FIG. 2, the microprocessor 104 determines the sleep functionality for sleep modes to be effected. This determination is made with software run by the processor 104. This sleep software ("Sleep SW") is indicated diagrammatically by cloud 200. The software, in turn, interacts with the sleep control logic 120 via the bus 122 to program logic 120 with information concerning what timing is to be executed by logic 120 when going to sleep or waking up from sleep.

As further illustrated in the particular example of FIG. 2, the transceiver chipset 102 includes the baseband transceiver 106, which includes respective sleep controllers for supporting other modes such as CDMA 1x, High Data Rate (HDR), UMTS, Global System for Mobile Communications (GSM), Global Positioning System (GPS), and other modes. The sleep software also controls or sets the operation of the sleep controllers in the baseband transceiver 106, where communication is effected by a bus 208 between the baseband transceiver 106 and the processor 104. The processor 104 also runs software (VCTCXO Controller SW 202) to control a Pulse Density Modulator (PDM) of the VCTCXO clock 124 in concurrent support of different modes as illustrated by communication bus 214. Connections between the VCTCXO Controller SW 202 and the Sleep SW 200 illustrate that an exchange information occurs therebetween concerning when the VCTCXO can be turned off and on, as illustrated in FIG. 2.

Since a goal of a sleep controller is to conserve power by reducing the power consumption of as many devices within a mobile transceiver, the sleep functionality of the present disclosed system interacts or affects various devices in the transceiver 100. For example, as explained above, various components within the transceiver chipset 102 are controlled to enter sleep modes. For instance, the baseband transceiver 106 may include sleep control. Additionally, the processor 104 may actually be put to sleep as well.

The sleep clock or crystal oscillator 126 is run continuously to provide a low power, uninterrupted clock source for the transceiver 100 during sleep modes. The system clock 124 also is affected by the sleep functionality. In particular, the sleep software 200 running on microprocessor 104 will issue controls via a bus 216 to a power management chip 204, which, in turn, controls the delivery of power to the VCTCXO 124 (thereby turning the system clock 128 on and off). As explained previously, the high power consumption clock 124 is turned off during sleep modes to converse energy.

The RF ICs 108, which support the baseband transceiver 106 and accompanying modes, are also affected by sleep functionality. In particular, the microprocessor 104 may issue instructions to RF IC 108 via a bus 218, such as a serial bus interface. Also the baseband receiver 114 may issue control signals to the RF IC or chip 116 via a serial bus 220.

FIG. 2 also illustrates that the transceiver 100 may include a user interface (UI) 210, such as a keypad, microphone, or other interfacing apparatus which input to the microprocessor. Similarly, the transceiver 100 may also connect to various peripherals 212, such as via a Universal Serial Bus (USB) or other serial or parallel connection. The sleep functionality is responsive to these input or communication connections since they present "rude" interrupts that may require sleep modes to be aborted or rescheduled.

It is noted here that the digital logic and other various devices in the transceiver 100 are operable with multiple clock regimes, which may be turned on/off to conserve power. Switching may be effected by a clock gating logic (not shown) or any other suitable switching device. As further illustrated in FIG. 2, each of the sleep controllers (i.e., the baseband transceiver sleep controllers and sleep control logic 120) receive input from the sleep clock 126 (receiver chipset 112 shown receiving both the system clock and sleep clock signals directly). As noted before, the sleep controllers are configured to switch their timing to the low-power sleep clock 126 during sleep modes to conserve power.

In the transceiver 100 of FIG. 2, the microprocessor 104 (with system clock turned on) can continue to display data on a display (not shown) of the transceiver 100 during streaming of packets received via the baseband receiver 112, such as streaming video via an OFDM system. Nonetheless, the receiver chipset 112 can still conserve power during "off" time by switching its system clocks and PLL off (e.g., disabling clocks in order to inactivate sub-blocks in the chipset 112) and switching the sleep control logic's (120) clock source to the sleep clock 126. In instances that do not involve direct display to the display, the microprocessor 104 may have time to go to sleep too.

In the disclosed transceiver 100 and, in particular, the receiver chipset 112, sleep modes can be activated during various states of the receiver chipset 112. The first of these states is an active state where data received via the RF chip 116 and ADC 118 is being demodulated burst by burst (e.g., a group of adjacent active symbols is forming a burst, in the case of an OFDM system). When receiving bursts of information in the active state, for example, sleep modes may be effected such as when received overhead information is being demodulated (e.g. OFDM overhead information symbols) or when receiving traffic or control channel data. Another state when sleep modes may be effected include deep sleep states, which are dormant states where no pending requests are being received and only periodic wakeups are necessary, such as for example updating information concerning what information will be broadcast (e.g., a program guide).

A function of the sleep control logic 120 is to minimize power consumption during sleep when the receiver chipset 112 is not receiving active bursts of information. Due to the nature of burst communication that the receiver chipset 112 is designed to receive, the operation of the chipset 112 tends to be systolic (i.e., occurring in bursts of processing corresponding to received bursts of information with idle processing times in between bursts). In certain systems, such as OFDM systems, bursts can last about 10 ms (4% duty cycle) or longer, depending on the payload configuration. Since there is no correlation between on/off cycles of the sleep controller 120 and other modes in the wireless device 100, the presently disclosed example includes independent sleep timelines for processor 104, which may include separate sleep timelines for multiple processors in the transceiver 102, and the baseband receiver chipset 112, although they share the same system clock derived from the VCTCXO clock 124. Furthermore, in order to prevent problems due to latencies inherent to software run by the microprocessor 104 and that the receiver chipset 112 could not tolerate such latency, it was recognized that sleep control for the receiver 112 would be more efficient using separate hardware logic (e.g., 120) to execute sleep modes in the receiver 112.

Although in the particular disclosed examples, the sleep control logic 120 executes a separate sleep timing operation for chipset 112, logic 120 nonetheless is configured to interface with various other portions of the transceiver 100. This is because the timing operation of the receiver affects and is affected by other operations of other parts of the transceiver 100. A more detailed block diagram of an exemplary implementation of the sleep control logic 120 and its interactions is illustrated in FIG. 3.

Figure 3:
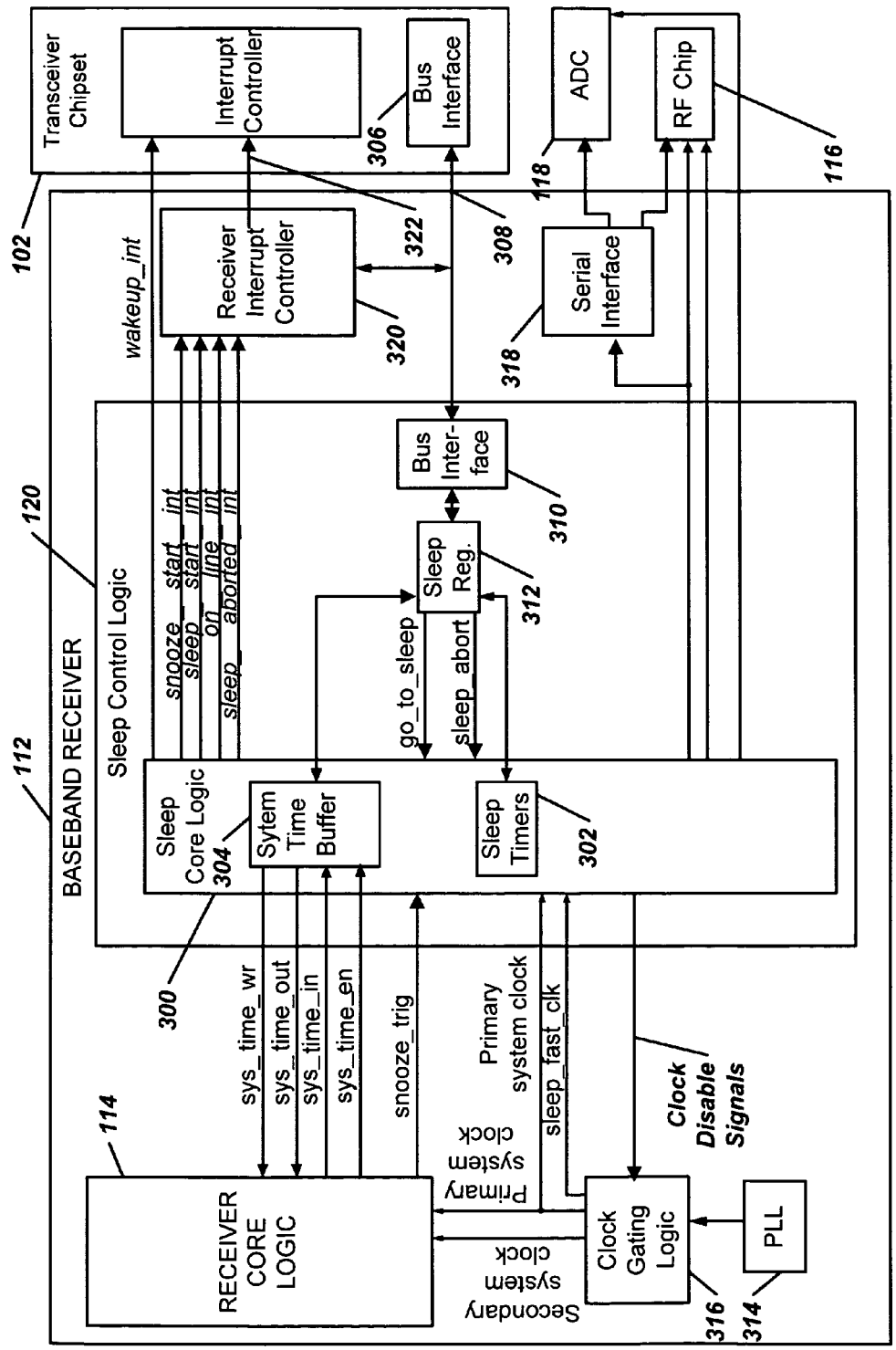
FIG. 3 is a block diagram of an exemplary baseband receiver chipset including sleep control logic.

As shown in FIG. 3, the sleep control logic 120 includes sleep core logic 300 having sleep timers 302 and system time buffer 304. The sleep timers 302 are programmed by the processor 104 via a bus interface 306 which interfaces with bus 308 between the processor 104 and the receiver chipset 112. The bus 308 is coupled to another interface 310 in the sleep control logic 120. A sleep register 312 is used to then direct programming information to sleep timers 302, such as timing information and predefined that the logic 120 will automatically execute when effecting the sleep timeline.

The baseband receiver 112 also includes a phase lock loop (PLL) 314, which generates the system clock and other clock domains or regimes. These clock signals are fed to a clock gating logic 316, which is used to selectively turn on and off the different clock domains based on clock disable signals received from core logic 300. From the Sleep Control Logic standpoint in the disclosed example of FIG. 3, multiple clock regimes are controlled through the clock gating logic 316. The first of these is a primary system clock regime. The next is a secondary clock regime, which is used during the draining process of the decoder output buffer (not shown on the diagram), when the burst demodulation has ended. Additional domains include a Sleep Core Logic fast clock regime (sleep_fast_clk), a sleep controller core sleep clock regime (not shown), and a RF serial interface block clock regime (used with serial bus interface 318, not shown).

It is noted that the microprocessor 104 can disable or enable each clock via a halt input, overriding the sleep controller hardware.

As illustrated, the core logic 300 is configured to issue a wakeup interrupt signal (wakeup_int) to the interrupt controller in the transceiver chipset 102. It is noted that this interrupt is dynamically determined based on programming information from the microprocessor 104 since the wakeup point is not the same for every sleep mode operation and changes from burst to burst.

In operation, sleep control logic 120 disables the primary and secondary system clocks via clock disable signals to conserve energy during a sleep mode. The sleep core logic 300 also disables one or more Phase Lock Loops (PLLs) 314, which are used to generate system clock regimes. The control logic, in turn, receives a system time synchronization pulse, sys_time_en, and exact timing information (sys_time_in) from Receiver Core Logic 114 before sleep begins, and updates (or triggers the update) the system time before sleep finishes. The microprocessor 104 and sleep control logic 120 operation are synchronized via interrupts multiplexed to a single transceiver GPIO signal 322 by interrupt controller 320, and wakeup_int. The microprocessor 104 (not shown in FIG. 3) communicates with the control logic 120 over the interface 306, 308, and 310. The control logic further interfaces to the RF and ADC chips 116, 118, through a serial bus interface 318 and a couple of discrete lines for issuing direct signals such as turning on the TXCO buffer in the RF chip 116.

According to the disclosed examples, software or instructions run by the microprocessor 104 are used to configure the sleep timeline. It is noted that the software can also "tag" bursts after which a snooze cycle or partial sleep cycle can automatically start. It is further noted that the sleep control logic hardware 120 executes the sleep and/or snooze timeline with the resolution of the system clock (sys_clk), which is greater than sleep clock frequency to preserve maximum accuracy.

Figure 4:
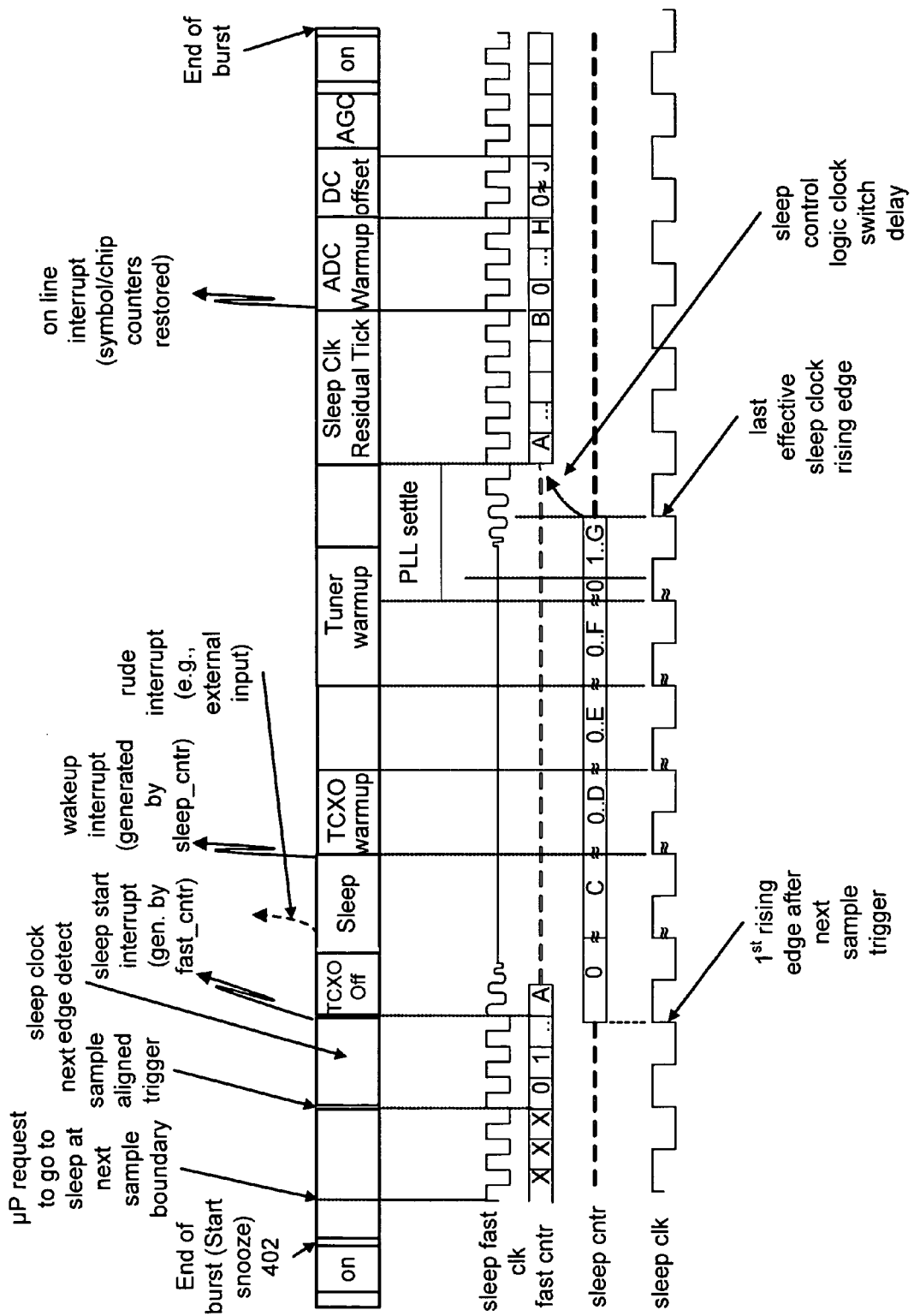
FIG. 4 is an exemplary timing diagram showing the timing operation of the sleep control logic.

FIG. 4 is an exemplary timing diagram showing the timing operation of the sleep control logic 120. Because the receiver chipset 112 does not actively track system time during sleep modes, the system time counter is not updated. Accordingly, the baseband receiver 114 is configured to tightly control the sleep time (i.e., the period between the assertion of the next sample-aligned trigger signal (sys_time_en), and pulsing of the on_line_int signal when system time counter is restored after wakeup. System time is known when sys_time_en is pulsed and an estimate is made for the system time when on_line_int is pulsed.

As may be seen in the timeline of FIG. 4, the VCTCXO 124 is shut down during sleep mode and, thus, the sleep_fast_clock which uses clock 124 as the source for timing, is also shut down. During the sleep period, from the first sleep clock rising edge after a next sample trigger, the sleep clock 126 is used for timing during the sleep mode (e.g., for determining how long to stay in sleep mode and when to issue the wakeup interrupt signal). The sleep clock is used for timing until the PLLs settle after wakeup as shown in FIG. 4. After the PLL settled (i.e., sleep_fast_clk is restored), timing for receiver 112 reverts to the system clock domain.

It was recognized, however, that a substantial source of power inefficiency in the receiver chipset 112 is long response times (latency) of the microprocessor (i.e., software) to real-time events, such as interrupts. This resulted in delay of shutdown of the RF chip 116. Accordingly, the presently disclosed sleep control logic 120 includes a "snooze" feature to provide for immediate RF chips 116 shutdown after the end of a received burst. The "snooze" allows shutdown of a portion of components, while leaving a minimum clock domain (secondary system clock) active, in order to allow the microprocessor 104 to finish processing the current task and drain the decoder output buffer. After processing is finished, the secondary system clock regime and the PLL can also be shut down. The majority of power consumption, however, is due to resources that are shut down at snooze time, particularly the RF chip 116. Thus, a significant degree of efficiency can be garnered through partial shutdown of components in the "snooze".

In an specific implementation, the "snooze" feature allows software to tag received bursts after which snooze/sleep cycle can occur, and let the sleep control logic 120 initiate RF and part of the digital circuitry shutdown automatically at the end of those bursts, when the snooze trigger (snooze_trig) is generated by hardware (see FIG. 3 and reference 402 as the start of a "snooze" cycle after a snooze tagged burst). In the OFDM systems, in particular, the burst snooze tags in the FFT descriptors are used to detect the last tagged burst sample. When this sample is processed by a Fast Fourier Transform (FFT) and passed to a descrambler, for instance, the snooze trigger is generated by Receiver Core Logic 114 and sent to the sleep control logic 120, as shown in FIG. 3. At this point, the RF chip 116, ADC 118, the front end blocks and the FFT are ready to be shut down. It is noted also that most of the time, interrupts to the microprocessor that indicate commencement of the snooze cycle will have already occurred by the time the software is ready to issue a go_to_sleep request. Thus, typically the sleep control logic 120 can effect a full sleep mode immediately after microprocessor 104 issues the go_to_sleep request.

It is also noted that sleep control logic 120 executes the sleep timeline based on the secondary system clock during snooze. The reason for this is twofold. First, the secondary system clock domain is still needed by the decoder output buffer, interrupt controller, and other blocks. Second, the process of computing sleep parameters and sleep clock frequency estimation is too complex to be done by hardware. For those reasons, the complete shutdown of the system clock and the PLL and switch to the sleep clock is not possible.

Figure 5:
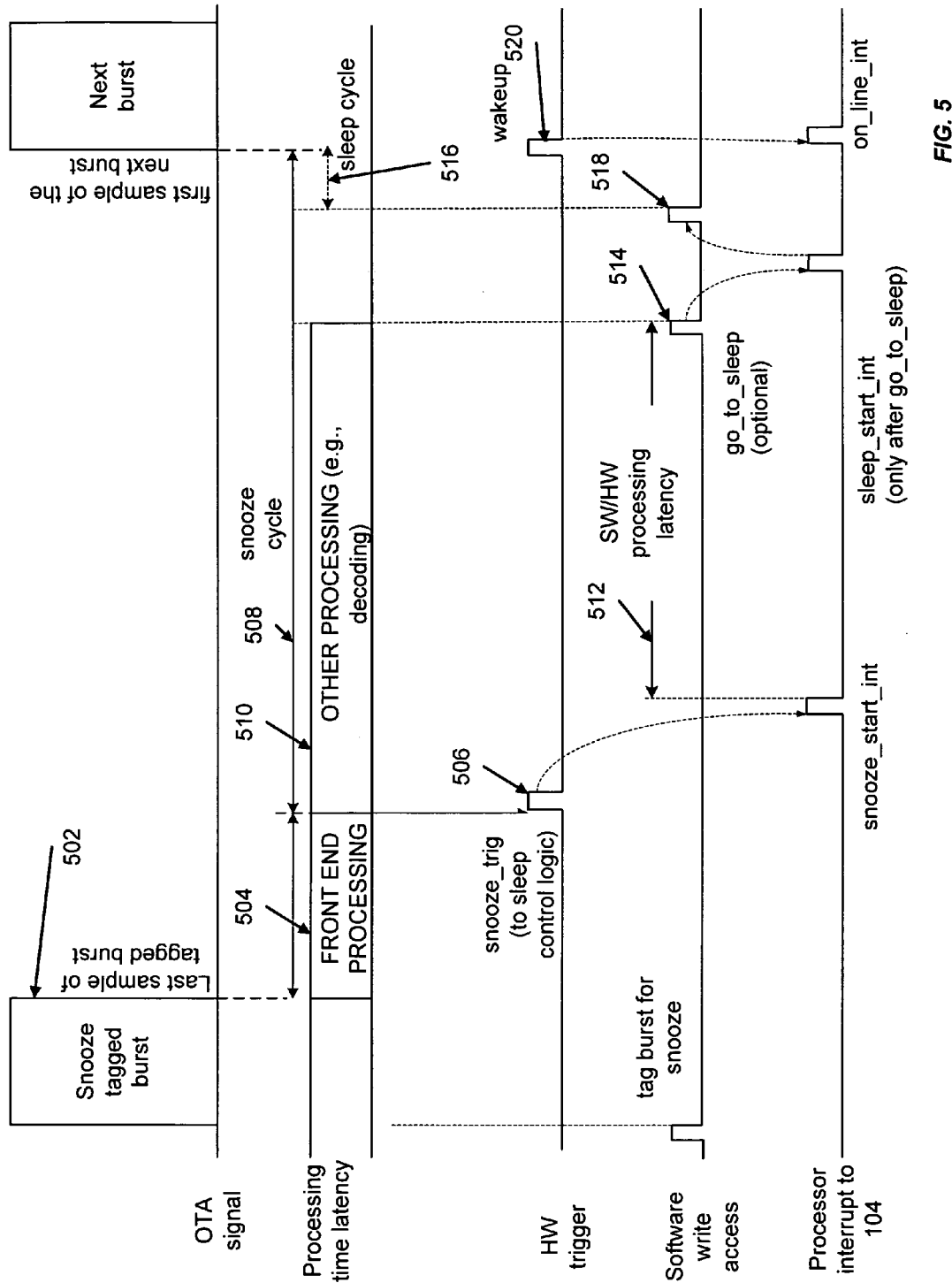
FIG. 5 is an exemplary timing diagram showing a "snooze" operation.

FIG. 5 illustrates a timeline for an exemplary snooze operation, which was discussed above. As shown, after an over the air signal comprising a snooze tagged burst 502 (tagged by software run on processor 104) is received by the transceiver 100. After the last sample of the burst 502, front end processing 504 is performed, such as FFT processing in the case of an OFDM system, as an example. Once this processing 504 is complete, the receiver core logic 114, which may be hardware, issues a snooze trigger signal (snooze trig) 506 to the sleep control logic 120 (see FIG. 3 also). Logic 120 then initiates a snooze cycle 508 where part of the components in chipset 112 may be shut down, such as the RF chip 116, and ADC 118, as examples. Since other processing 510, such as decoding, is still being performed, not all components may be put to sleep.

If before the other processing 510 is completed, and the software and hardware processing latency 512 does not exceed this time, a go_to_signal 514 may be processed. After signal 514 has issued, synchronization occurs between hardware and software and software proceeds to issue a sleep execution 518. If request 518 occurs before wakeup signal 520, then sleep is accepted by hardware and starts immediately. Otherwise it is rejected and snooze 508 continues to start of next pulse and the remaining components are put to sleep for a full sleep cycle 516. If the latency 512 is longer than processing 510 (this is not shown on timeline), then the sleep control logic will not initiate a full sleep.

Figure 6:
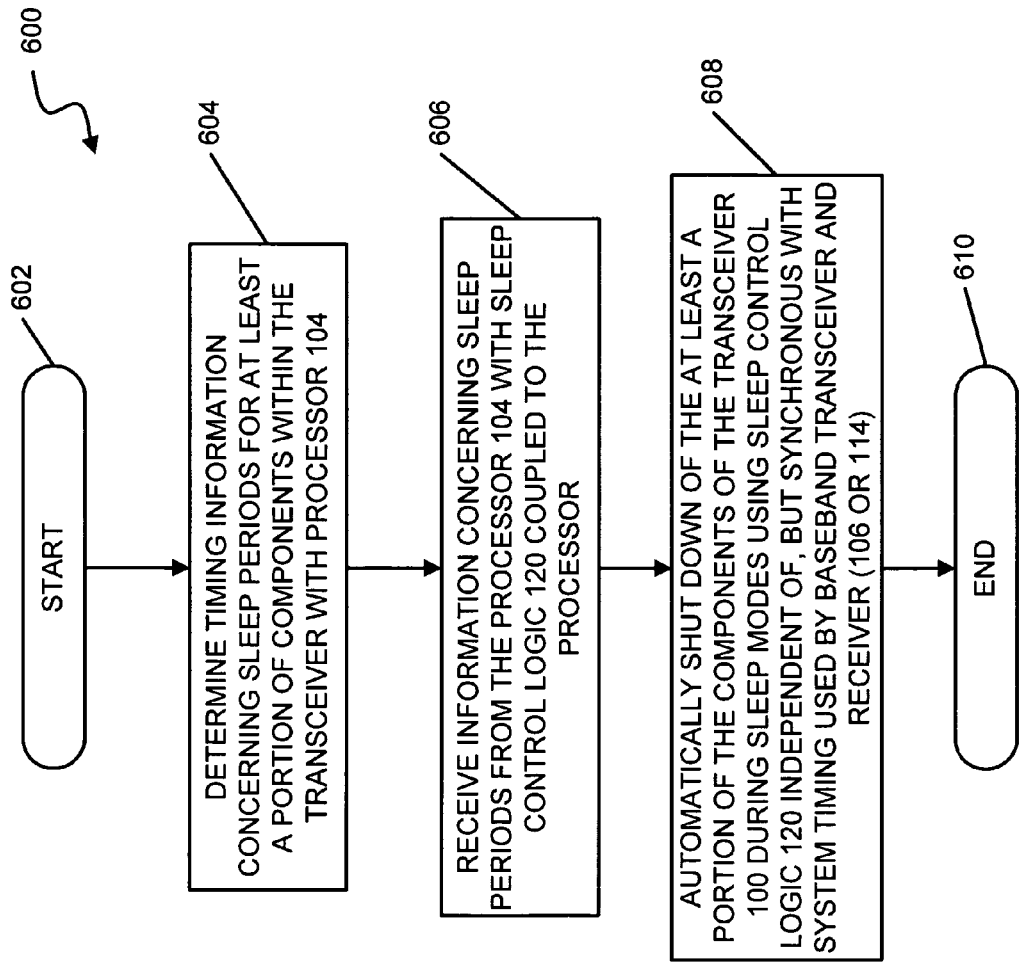
FIG. 6 is a flow diagram of an exemplary method for sleep mode control.

FIG. 6 illustrates an exemplary flow diagram of a process 600 for effecting sleep mode control. As shown, the process 600 begins at start block 602. Flow proceeds to block 604 where the microprocessor 104 determines timing information concerning sleep periods for at least a portion of components within the transceiver 100. That is, microprocessor determines through the sleep software 200 configures the timeline for sleep modes and also may determine which components are allowed to be powered down, such as during "snooze" modes which effect only partial shutdowns.

After the determination in block 604, flow proceeds to block 606 where the logic control 120 receives the determined information or programming. This is performed, for example, by the microprocessor 104 writing the information to the sleep control logic 120 via bus interface 306, bus 308, bus interface 310 and sleep registers 312 as illustrated in FIG. 3. After the sleep timeline information is written in the sleep control logic 120, flow proceeds to block 608.

At block 608, the sleep control logic 120 automatically shuts down at least a potion of the components of the transceiver 100 during sleep modes, either full sleep mode or snooze modes. The operation in block 608 also includes bringing back or using sleep control logic 120 independent of, but synchronous with receiver or transceiver 106 or 114. That is, the sleep control logic 120 is configured to effect or execute the sleep timeline from entering sleep modes to bringing powered down components back out of sleep mode to powered up operation. This operation is automatically executed by the logic 120 independent of the microprocessor 104 in the sense that the microprocessor does not trigger the sleep modes for the receiver chipset 112. Notwithstanding, the sleep mode operation is performed synchronous with the system timing (e.g., TCXO system clock) used by the receiver or transceiver 106 or 114.

It is noted that the process of block 608 is repeated for each awake/sleep mode cycle, which continue while the transceiver is operational. The process in blocks 604 and 606 may be performed during initialization of the transceiver 100, but can also be performed anytime after initialization as well if desired.

Figure 7:
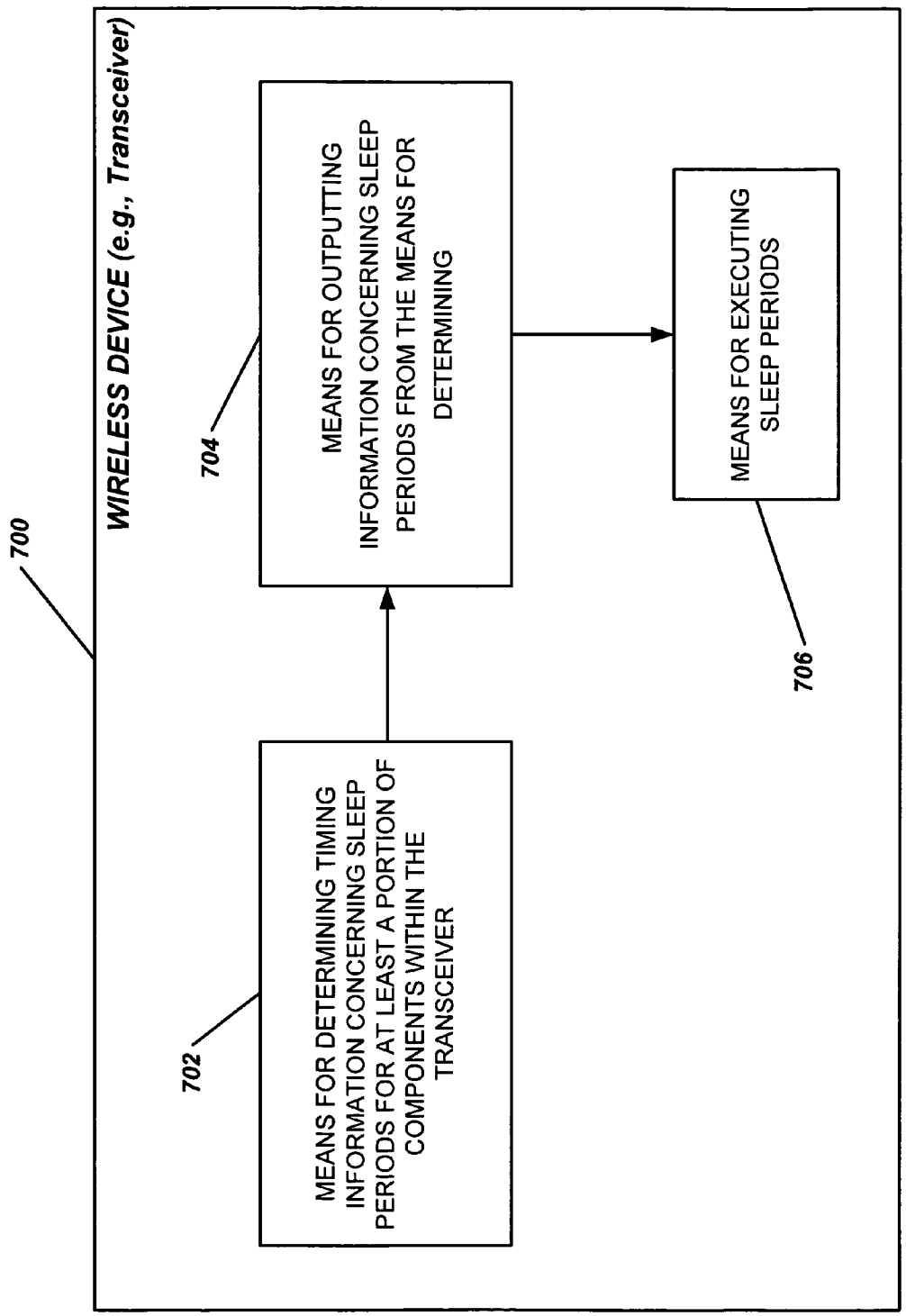
FIG. 7 is a block diagram of a further exemplary transceiver.

FIG. 7 is block diagram of a further exemplary transceiver 700 according to the present disclosure. As shown, the transceiver 700 includes means for determining timing information concerning sleep periods for at least a portion of components within the transceiver 702. This means may be, for example, processor 104 discussed previously. Coupled to means 702 is means for outputting information concerning sleep periods from the means for determining 704. Means 704 may be implemented by bus interface 306, bus 308, bus interface 310, and sleep register 312, for example. Coupled to means 704 is a means for executing sleep periods 706, which is configured to shut down the at least a portion of the components of the transceiver during power reduction periods independent of and synchronous with the means for determining timing information. Means 706 may be implemented, for example, by sleep control logic 120.

As described in the foregoing, the inefficiencies that arise from latencies due to software processing may be overcome by effecting sleep mode execution through hardware logic. Furthermore, utilization of a partial shutdown of components yields a further rise in the efficiency of sleep mode in cases where sleep modes would be thwarted due to software latency.

It is noted that the baseband receiver 114 and the sleep control logic 120 may reside in a separate ASIC or similar processing circuit as illustrated, but may also be part of an ASIC or chipset incorporated with the transceiver chipset 102. It is further noted that the above-described apparatus and methods may also be utilized for sleep control performed by the baseband transceiver 106.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claimed is:

1. A sleep controller for use in a receiver within a wireless transceiver, the controller comprising:
a sleep control logic communicatively coupled to a processor to receive therefrom a timeline indicative of power reduction periods produced by the processor,
said sleep control logic configured to shut down and power up at least some components of the receiver during power reduction periods in accordance with the time line independent of the processor,
wherein a portion of the at least some components of the receiver are shut down in accordance with the timeline upon completion of a portion of signal processing of a communication signal received by the receiver,
wherein the signal processing includes performing Fast Fourier Transform (FFT) processing to identify a burst snooze tag in an FFT descriptor of the signal.

2. The sleep controller as defined in claim 1, wherein the sleep control logic is further configured to effect shutting down and powering up of the at least some the components of the receiver independently and synchronously with a transceiver system timing.

3. The sleep controller as defined in claim 1, wherein the sleep control logic is further configured to shut down another number of components of the at least some components of the receiver upon completion of the signal processing of the communication signal received by the receiver.

4. The sleep controller as defined in claim 1, wherein the sleep control logic is further configured to issue an interrupt signal to the processor that is operable to wake up the processor after determination of an end of a sleep mode.

5. The sleep controller as defined in claim 1, wherein the processor is configured to program the sleep control logic with the timeline.

6. The sleep controller as defined in claim 1, wherein the sleep control logic is part of a baseband receiver in the receiver, wherein the baseband receiver is configured to receive burst communication signals.

7. The sleep controller as defined in claim 1, wherein the sleep control logic is configured to determine an end timing of a sleep mode and initiate wakeup of the at least some components of the receiver.

8. The sleep controller as defined in claim 7, wherein the sleep control logic is configured to issue a wakeup interrupt signal to the processor after determining an end timing of a sleep mode.

9. The sleep controller as defined in claim 8, wherein the wakeup interrupt signal is a dynamic parameter determined by the processor after a received burst of data.

10. The sleep controller of claim 1, wherein the timeline identifies the portion of the at least some components of the receiver that are shut down in accordance with the time line upon completion of the portion of the signal processing of the communication signal received by the receiver.

11. The sleep controller of claim 1, wherein the processor is further configured to tag the snooze burst of the communication signal received by the receiver, to initiate shutting down of the portion of the at least some components of the receiver upon completion of the portion of the signal processing of the communication signal received by the receiver.

12. The sleep controller of claim 11, wherein the processor is further configured to transfer an indication of the partial shutdown tag to the sleep control logic upon completion of the portion of the signal processing of the communication signal received by the receiver.

13. The sleep controller of claim 12, wherein the sleep control logic is further configured to receive the indication of the partial shutdown tag, upon completion of the portion of the signal processing of the communication signal received by the receiver, and in response thereto shut down the portion of the at least some components of the receiver.

14. The sleep controller of claim 13, wherein another portion of components of the at least some components of the receiver are shut down if the signal processing by the processor is completed by a predetermined time.

15. A transceiver apparatus comprising:
processing means for determining a time line of power reduction periods for at least some components of a receiver within the transceiver apparatus;
means for exporting the timeline from the processing means; and
sleep control means for receiving the timeline from the processing means and for shutting down a portion of the at least some components of the receiver in accordance with the time line upon completion of a portion of signal processing of a communication signal received by the receiver, wherein the signal processing includes performing Fast Fourier Transform (FFT) processing to identify a burst snooze tag in an FFT descriptor of the signal.

16. The transceiver apparatus as defined in claim 15, the sleep control means further comprising shutting down another number of components of the some components of the receiver in accordance with the timeline upon completion of the signal processing of the communication signal received by the receiver.

17. The transceiver apparatus as defined in claim 15, wherein the sleep control means is configured to determine an end of a sleep mode and issue an interrupt signal to the processing means to wake up the processing means based on the determination of the end of the sleep mode.

18. The transceiver apparatus as defined in claim 17, wherein the processing means is configured to program the sleep control means with the timeline.

19. The transceiver apparatus as defined in claim 15, wherein the sleep control means is part of a baseband receiver in the receiver, wherein the baseband receiver is configured to receive burst communication signals.

20. The transceiver apparatus as defined in claim 15, wherein the sleep control means is configured to determine an end timing of a sleep mode and initiate wakeup of the at least some components of the receiver.

21. The transceiver apparatus as defined in claim 20, wherein the sleep control means is configured to issue a wakeup interrupt signal to the processing means after determining an end timing of a sleep mode.

22. The transceiver apparatus as defined in claim 21, wherein the wakeup interrupt signal is a dynamic parameter determined by the processing means after a received burst of data.

* * * * *